United States Patent [19]

Spiero et al.

[11] Patent Number: 5,434,628
[45] Date of Patent: Jul. 18, 1995

[54] APPARATUS FOR USE IN AN INTERCONNECTION SYSTEM

[75] Inventors: Richard C. Spiero, Eindhoven, Netherlands; Terence A. Douglas, Redhill, Great Britain; Marnix C. Vlot, Eindhoven, Netherlands

[73] Assignee: U.S. Philips Corporation, New York, N.Y.

[21] Appl. No.: 268,078

[22] Filed: Jun. 28, 1994

Related U.S. Application Data

[62] Division of Ser. No. 26,348, Mar. 4, 1993, Pat. No. 5,349,391.

[30] Foreign Application Priority Data

Apr. 8, 1992 [EP] European Pat. Off. ............ 92201003

[51] Int. Cl.[6] ............................................. H04N 5/268
[52] U.S. Cl. ..................................... 348/705; 307/87; 307/115; 307/130; 327/403
[58] Field of Search ................ 348/705; H04N 5/268; 340/826, 827; 307/241, 242, 85, 86, 113, 115, 125, 139, 130, 140, 87

[56] References Cited

U.S. PATENT DOCUMENTS

| | | | |
|---|---|---|---|
| 5,237,211 | 8/1993 | Tanaka et al. | 307/241 |
| 5,305,105 | 4/1994 | Heo | 348/705 |
| 5,331,223 | 7/1994 | Nishijima | 348/705 |

*Primary Examiner*—James J. Groody
*Assistant Examiner*—Jeffrey S. Murrell
*Attorney, Agent, or Firm*—Edward W. Goodman

[57] ABSTRACT

The apparatus includes first, second and third connectors, a control signal generator (5.11) and first and second switches (5.9, 5.10). The first and second connectors each have a signal input terminal, a signal output terminal and a control signal terminal. The third connector has a signal input terminal (5.7) and eventually a control signal terminal (5.8). The first and second switching means each have first (a), second (b) and third (c) terminals, the first terminal (a) of the first switches (5.9) being coupled to the signal output terminal (5.5) of the second connector, the second terminal (b) of the first switches (5.9) being coupled to the signal input terminal (5.1) of the first connector, the first terminal (a) of the second switching means (5.10) being coupled to the signal output terminal (5.2) of the first connector, the second terminal (b) of the second switching means (5.10) being coupled to the signal input terminal (5.4) of the second connector. The first and second switches (5.9, 5.10) are adapted to couple the second (b) or the third (c) terminal to the first terminal (a) under the influence of a first or second control signal respectively, supplied by the control signal generator (5.11). The control signal generator (5.11) has a first terminal (10) coupled to the control signal terminals (5.3, 5.6) of the first and second connectors, and an output terminal (12, 13) for supplying the first and second control signal for the first and second switches (5.9, 5.10) respectively. The signal input terminal (5.7) of the third connector is coupled to the third terminals (c) of the first and second switches (5.9, 5.10). The control signal generator (5.11) is further adapted to generate a control signal for at least one of the first and the second switches, in response to the control signal applied to a second terminal (11).

Further an input-output circuit is provided for coupling a controller included in the control signal generator (5.11) to line 10 of the SCART cable.

10 Claims, 8 Drawing Sheets

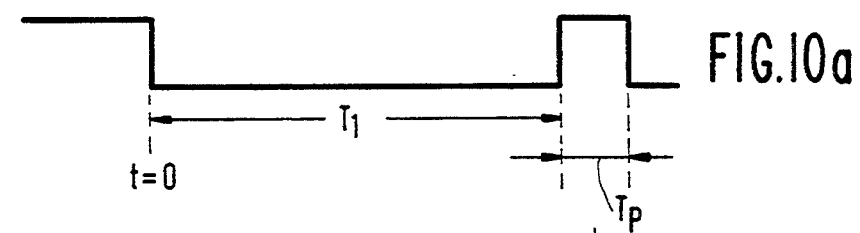
FIG.10a
'0' bit
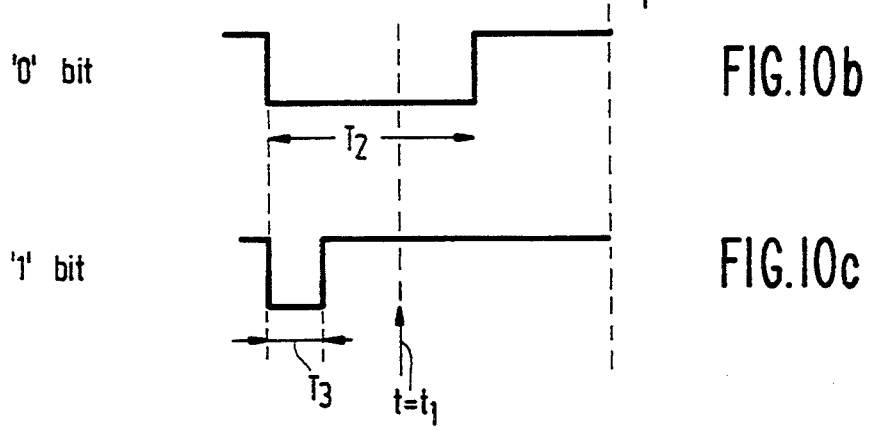
FIG.10b
'1' bit
FIG.10c
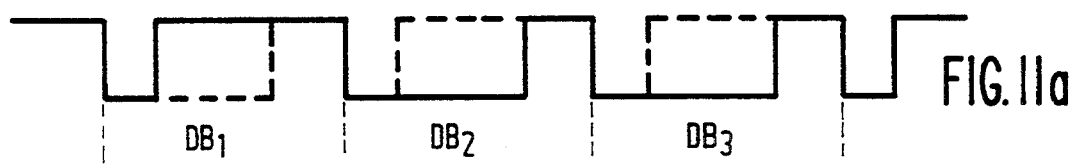
FIG.11a
FIG.11b
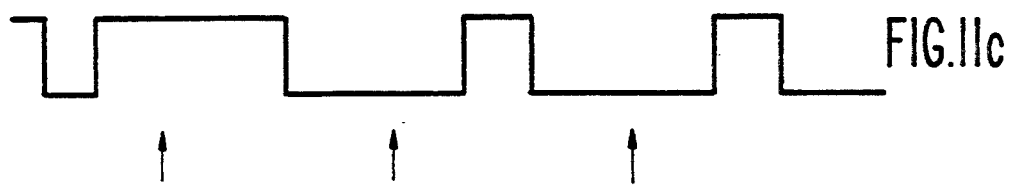
FIG.11c

APPARATUS FOR USE IN AN INTERCONNECTION SYSTEM

This is a division of application Ser. No. 08/026,348, filed Mar. 4, 1993, now U.S. Pat. No. 5,349,391.

BACKGROUND OF THE INVENTION

1. Field of the Invention

The invention relates to an apparatus comprising first and second connector means and first and second switching means, the first and second connector means each having a signal input terminal, a signal output terminal and a control signal terminal, the first and second switching means each having first, second and third terminals, the first terminal of the first switching means being coupled to the signal output terminal of the second connector means, the second terminal of the first switching means being coupled to the signal input terminal of the first connector means, the first terminal of the second switching means being coupled to the signal output terminal of the first connector means, the second terminal of the second switching means being coupled to the signal input terminal of the second connector means, the first and second switching means being adapted to couple the second or the third terminal to the first terminal under the influence of a first or second control signal respectively, the apparatus further comprising control signal generator means having a first terminal coupled to the control signal terminals of the first and second connector means, and an output terminal for supplying the first and second control signal for the first and second switching means respectively, The invention further relates to an input-output circuit that can be used in the control signal generator means which is provided with a controller, in the apparatus.

Such apparatuses can be used in combination with other apparatuses of like construction so as to form a chain of apparatuses in which two signal paths are realized, a first 'down' path and a second 'up' path. The first connector means of an apparatus in the chain is coupled to a second connector means of a previous apparatus in the chain, and the second connector means of the apparatus is coupled to a first connector means of a subsequent apparatus in the chain. The signal path formed by the connections of the signal input terminals of the first connector means to the signal output terminals in the second connector means, via the first switching means, of the apparatuses in the chain is called the 'down' path. The signal path formed by the connections of the signal input terminals of the second connector means to the signal output terminals in the first connector means, via the second switching means, of the apparatuses in the chain is called the 'up' path.

2. Description of the Related Art

The connector means are preferably in the form of a SCART connector. This means that the apparatuses are interlinked by means of SCART cables. The control signal terminals in the connector means of the apparatuses are in that case the pins with number 10 in the SCART connectors.

It should be noted that SCART connectors and cables are well known in the art, see the magazine Funk-Technik 38(1983), heft 5, pp. 208-212.

The termination of the chain at the 'up' side can be realized by a television apparatus, provided with a single connector means. In the same way one further apparatus having a single connector means, preferably a video recorder, can be connected to the 'down' end of the chain.

The video signal transported via a path, such as the 'up' path can have various formats, such as CVBS, Y/C or RGB. The transmission of a CVBS video signal requires only one signal line relative to ground. The transmission of the Y/C video signal requires two signal lines, and the transmission of an RGB signal requires three signal lines relative to ground. The 'up' path, which realizes the signal transmission towards the television apparatus has the possibility of transmitting either one of the three video signal formats mentioned above, that is CVBS via line 19 in the SCART cable, Y and C via the lines 19 and 15, respectively, and R,G and B via the lines 15, 11 and 7, respectively.

The 'down' path realizes the signal transmission towards the video recorder, and realizes a video signal transmission of either the CVBS or the Y/C format. CVBS is transmitted via the line 20 in the SCART cable, and Y and C are transmitted via the lines 20 and 7, respectively.

It should thus be noted that a signal input or output terminal does not neccessarily mean a single input or output terminal, but can each comprise one, two or three sub-terminals, dependent of the signal format (or formats) that should be transmitted via the 'up' and 'down' path.

SUMMARY OF THE INVENTION

The invention has for its object to provide further apparatuses for such a chain construction.

The apparatus according to the invention is, apart from the use in a chain construction as described above, also usable in a situation where only two apparatuses, each provided with a single connector means, are coupled together, e.g. via a SCART cable.

The apparatus in accordance with the invention is characterized in that the apparatus further comprises third connector means having a signal input terminal, the signal input terminal of the third connector means being coupled to the third terminals of the first and second switching means, the control signal generator means having a second terminal for receiving a control signal, and being adapted to generate a switching control signal for at least one of the first and the second switching means, in response to the control signal applied to its second terminal.

The invention is based on the following recognition. It has been recognized that, if the chain has no open ends anymore, it is impossible to connect a further apparatus which is provided with a single connector means, such as a SCART connector, to the chain. The apparatus in accordance with the invention however makes it possible to connect such further apparatus to the chain. The apparatus according to the invention can in fact be an adapter which realizes an additional coupling to the chain by means of the third connector means to which the further apparatus, provided with the single connector means, can be coupled. The further apparatus to be connected to the adapter apparatus in accordance with the invention can be an apparatus for supplying a signal. By means of the adapter apparatus, it has become possible to supply the signal supplied by the further apparatus either to the 'up' path, or to the 'down' path, or to both paths.

In order to interconnect apparatuses having a CVBS signal output or an Y/C signal output, but not being provided with an output for supplying a control signal on pin 8 on the SCART cable, the apparatus in accordance with the invention is characterized in that it comprises a detector unit having an input and an output, the detector unit being adapted to detect the presence of a signal at the signal input terminal of the third connector means and to generate a control signal at its output upon the detection of the presence of said signal, the input of the detection unit being coupled to the signal input terminal and the output being coupled to the second terminal of the control signal generator means, the control signal generator means being adapted to generate a control signal for at least one of the first and the second switching means, in response to the control signal applied by the detector unit. The detector unit detects the presence of a signal at the signal input terminal of the third connector means and subsequently generates a control signal which is suppled to the control signal generator means. This enables the generator means to generate a switching signal to at least one of the first and second switching means, so as to switch the signal applied to the signal input terminal of the third connector means to the signal output terminal of either the first or the second or both the first and the second connector means.

In order to interconnect apparatuses, provided with a single connector means in the form of a SCART connector, to the chain, the adapter apparatus may be further characterized in that the third connector means further comprises a control signal terminal, which is coupled to the second terminal of the control signal generator means, the control signal generator means being adapted to generate a control signal for at least one of the first and the second switching means, in response to the control signal applied to the control signal terminal.

This solves a problem when connecting a present day apparatus to the chain via the third connector means. Such apparatuses are not capable of supplying control signals on the pin with number 10 on its connector means in the form of a SCART connector, via which the further apparatus is coupled to the third connector of the adapter apparatus according to the invention. Present day apparatuses, such as a video recorder, which function as a signal source, are capable of supplying a control signal on pin 8 of their SCART connectors, indicating that the apparatus in question is switched in a mode so as to act as a signal source. The control signal terminal of the third connector means of the adapter apparatus is thus not pin 10, but pin 8 of the SCART connector. The control signal terminal of the third connector means is now connected to the second terminal of the control signal generator means of the adapter apparatus. The control signal generator means is now capable of generating, in response to the control signal from the further apparatus and applied to its second terminal, control signals at its output for switching either the first or the second switching means, or both in a position so as to make a connection between the signal input terminal of the third connector means and the signal output terminal of either the first or the second or both the first and the second connector means. Further the control signal generator means are adapted to generate, in response to the control signal applied to its second terminal, a control signal at its first terminal, that is a control signal on the line 10 of the SCART cables connecting the adapter apparatus to adjacent apparatuses in the chain, so as to enable signal paths to be established 'upwards' and eventually also 'downwards' in the chain, via those adjacent apparatuses.

The apparatus in accordance with the invention may be further characterized in that it further comprises third switching means, having a first, second and third terminal, the third connector means further comprises a signal output terminal, the signal output terminal of the third connector means being coupled to the first terminal of the third switching means, the second terminal of the third switching means being coupled to the signal input terminal of the first connector means and the third terminal of the third switching means being coupled to the signal input terminal of the second connector means, the third switching means being adapted to couple the second or the third terminal to the first terminal. This enables a video signal reproducer and recording apparatus, such as a video recorder of standard construction, that is: being provided with a single (SCART) connector means, to be coupled to the chain. Third switching means are provided for selecting the video signal present on either the 'up' path, or the 'down' path, for recording on the video recorder.

An input-output circuit that can be used in the control signal generator means which is provided with a controller, in the above mentioned apparatus comprises a first terminal that can be coupled to the first terminal of the control signal generator means, an input that can be coupled to an output of the controller, and an output that can be coupled to an input of the controller, is characterized in that the buffer circuit further comprises first low-pass filter means coupled between the input terminal and the first terminal, and diode means coupled between the first terminal and a first point of constant potential. This circuit realizes an improved coupling of the controller in the control signal generator means to the line 10 of the SCART cable.

BRIEF DESCRIPTION OF THE DRAWINGS

These and other aspects of the invention will be further explained with reference to embodiments described in the following drawings, in which

FIG. 10 shows the various bit formats for the bits in the message frame of FIG. 9;

FIG. 11 shows the interaction of an initiator and a follower on the line 10 of the SCART cable;

DESCRIPTION OF THE PREFERRED EMBODIMENT

Figure 1:
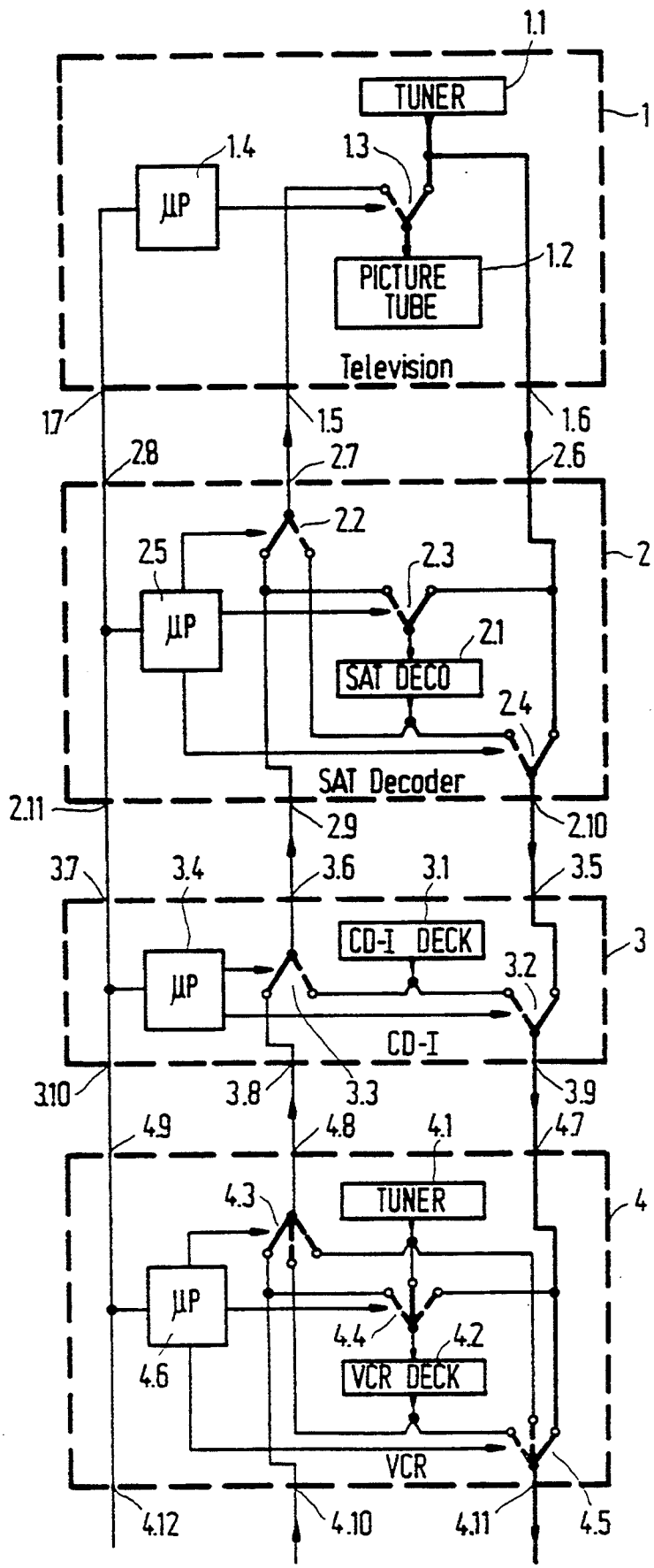
FIG. 1, 2 and 3 show a number of situations in which an interconnection system of a number of video apparatuses connected in a chain can be used.

FIG. 1 shows an interconnection system for a number of video apparatuses, such as a television apparatus 1, a satellite decoder apparatus 2, a CD-I player 3 and a video recorder 4. The television apparatus 1 includes a tuner 1.1, a picture tube 1.2, a source selector switch 1.3 and a microprocessor circuit 1.4. The television apparatus 1 further comprises connector means, preferably in the form of a SCART connector, having a signal input terminal 1.5, a signal output terminal 1.6 and a control signal terminal 1.7.

The satellite decoder apparatus 2 comprises a satellite decoder 2.1, selector switches 2.2, 2.3 and 2.4, and a microprocessor circuit 2.5. The decoder apparatus 2 further comprises first connector means, preferably in the form of a SCART connector, having a signal input terminal 2.6, a signal output terminal 2.7 and a control signal terminal 2.8, and comprises second connector means, preferably in the form of a SCART connector, having a signal input terminal 2.9, a signal output terminal 2.10 and a control signal terminal 2.11. The control signal terminals 2.8 and 2.11 are interconnected.

The CD-I player 3 comprises a CD-I deck 3.1, selector switches 3.2 and 3.3 and a microprocessor circuit 3.4. The CD-I player 3 further comprises first connector means; preferably in the form of a SCART connector, having a signal input terminal 3.5, a signal output terminal 3.6 and a control signal terminal 3.7, and comprises second connector means, preferably in the form of a SCART connector, having a signal input terminal 3.8, a signal output terminal 3.9 and a control signal terminal 3.10. The control signal terminals 3.7 and 3.10 are interconnected.

The video recorder 4 comprises a tuner 4.1, a VCR deck 4.2, selector switches 4.3, 4.4 and 4.5 and a microprocessor circuit 4.6. The video recorder 4 further comprises first connector means, preferably in the form of a SCART connector, having a signal input terminal 4.7, a signal output terminal 4.8 and a control signal terminal 4.9, and comprises second connector means, preferably in the form of a SCART connector, having a signal input terminal 4.10, a signal output terminal 4.11 and a control signal terminal 4.12. The control signal terminals 4.9 and 4.12 are interconnected.

The position of the selector switch 1.3 in the television apparatus 1 is electrically controllable by means of a control signal generated by the microprocessor circuit 1.4. The positions of at least the selector switches 2.2 and 2.4 in the satellite decoder apparatus 2 are electrically controllable by means of control signals generated by the microprocessor circuit 2.5. The position of the selector switch 2.3 can be controlled either manually or electrically by means of a control signal generated by the microprocessor circuit 2.5. The positions of the selector switches 3.2 and 3.3 in the CD-I player 3 are electrically controllable by means of control signals generated by the microprocessor circuit 3.4. The positions of at least the selector switches 4.3 and 4.5 in the video recorder 4 are electrically controllable by means of control signals generated by the microprocessor circuit 4.6. The position of the selector switch 4.4 can be controlled either manually or electrically by means of a control signal generated by the microprocessor circuit 4.6.

Identical apparatuses as the apparatuses 2, 3 and 4 described above, for instance a second video recorder identical to the video recorder 4, can be connected to the second connector means of the video recorder 4.

The electrical line in the SCART cable connecting the control signal terminals 1.7 and 2.8, 2.11 and 3.7, 3.10 and 4.9 is line number 10 in that cable. The relevant terminals are thus in fact the pins number 10 in the SCART connectors.

FIG. 1 shows the simplest connection. The only pertinent signal connection is the internal connection from the tuner 1.1 to the picture tube 1.2. All other apparatuses are in the standby mode, which implies that the selector switches 2.4, 3.2 and 4.5 are in the position as shown, so that the tuner signal, supplied by the television apparatus 1 at its signal output terminal 1.6 is looped through in downwards direction, so that, if needed, it can be recorded by the video recorder 4, if its selector switch 4.4 is its correct position, namely to the fight.

The signal path that is the most important for the specific mode is shown as a bold line. Signal paths of lesser significance are shown in medium bold lines, and the other paths that are non-relevant are shown in thin lines.

If the user decides to record the TV program supplied by the television apparatus, he positions the selector switch 4.4 in its right position, so that the signal input terminal 4.7 is coupled to the input of deck 4.2. The switching in of the recording mode in video recorder 4 is detected in microprocessor 4.6. Upon detection of this switching in of the recording mode, it generates a control signal which is supplied via the output 4.9 to the other apparatuses. Upon receipt of this control signal in the microprocessors 2.5 and 3.4, those microprocessors are disabled to control the selector switches 2.4 and 3.2, respectively. The connection from the signal output 1.6 of the television apparatus downwards to the signal input 4.7 of the video recorder 4 is thus maintained, and protected against disconnection upon switching either one of the apparatuses 2 or 3 from the standby mode in its switched-on mode.

Suppose that, while watching the TV program, the user decides to record another program. The user thus selects, by means of the selector switch 4.4, the output of tuner 4.1 which supplies the other TV program. The microprocessor 4.6 detects the switching in of the recording mode of the video recorder and subsequently generates a switching signal for the selector switch 4.3 so as to position the switch 4.3 so, that the output of the tuner 4.1 is coupled to the signal output terminal 4.8. The TV program being recorded can thus be checked by switching the switch 1.3 to the other position.

Figure 2:
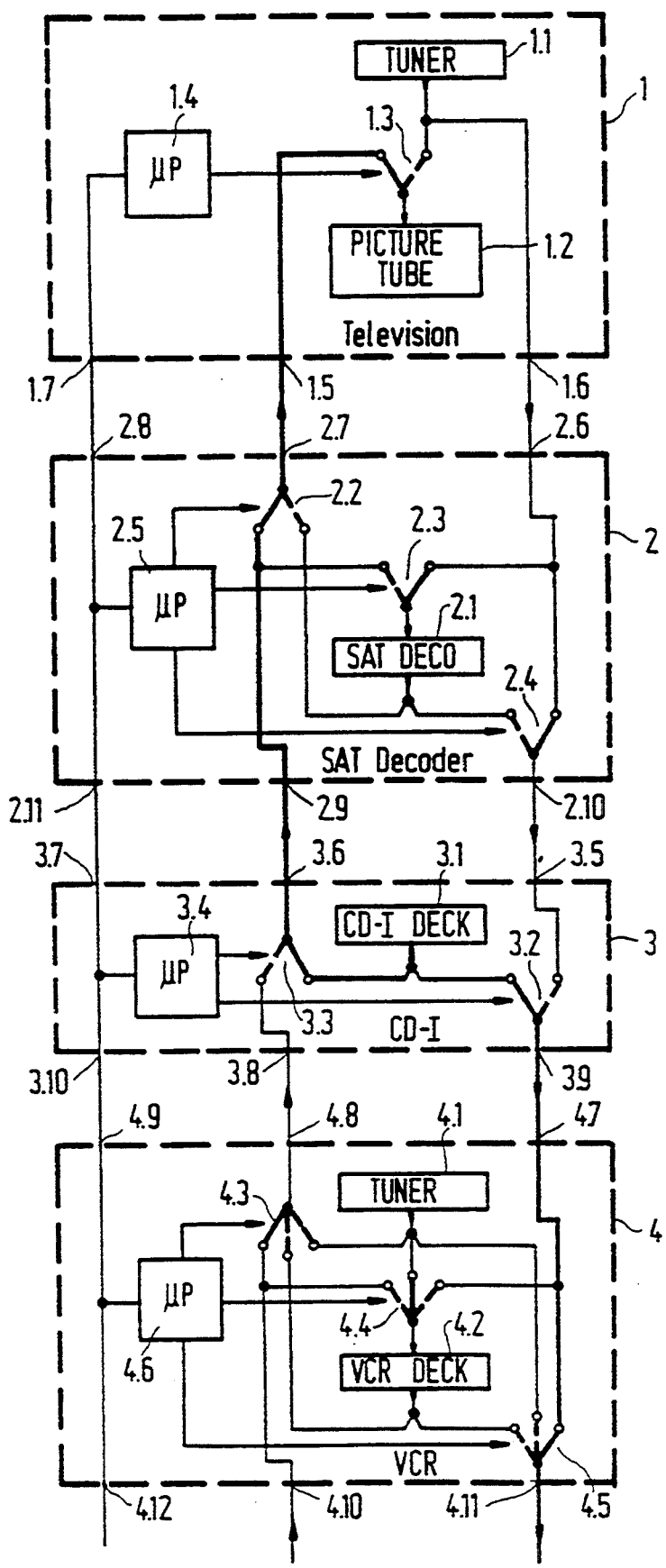

FIG. 2 shows, when going out from the situation as shown in FIG. 1, the situation where the CD-I player 3 is switched to reproduction. Switching the CD-I player to reproduction is detected by the microprocessor 3.4, which supplies control signals to the selector switches 3.2 and 3.3 so as to position them in the position as shown. The signal reproduced is thus available at the signal outputs 3.6 and 3.9 of the player 3. The microprocessor 3.4 further generates a control signal at the control signal terminals 3.7 and 3.10, which control signal is thus supplied to all other apparatuses connected in the chain. Upon receipt of the control signal by the microprocessor 1.4 in the television apparatus 1, this microprocessor generates a switching signal which is supplied to the selector switch 1.3, under the influence of which the switch 1.3 is positioned in the position as shown. The signal reproduced by the CD-I player 3 can thus be displayed on the tube 1.2 of the television apparatus 1 and recorded by the video recorder 4, if needed.

Recording the signal supplied by the CD-I player 3 means that the user selects the signal to be recorded by means of selector switch 4.4, by positioning the switch 4.4 in its fight position, so that the signal input terminal 4.7 is coupled to the input of deck 4.2.

In the same way as has been said above with reference to FIG. 1, in relation to the recording of a TV program supplied by the television apparatus 1 by the video recorder 4, it should be mentioned here that, the position of the switch 3.2 is protected, so that the connection between the output of CD-I deck 3.1 and the input of VCR deck 4.2 is maintained as long as recording continues.

Figure 3:
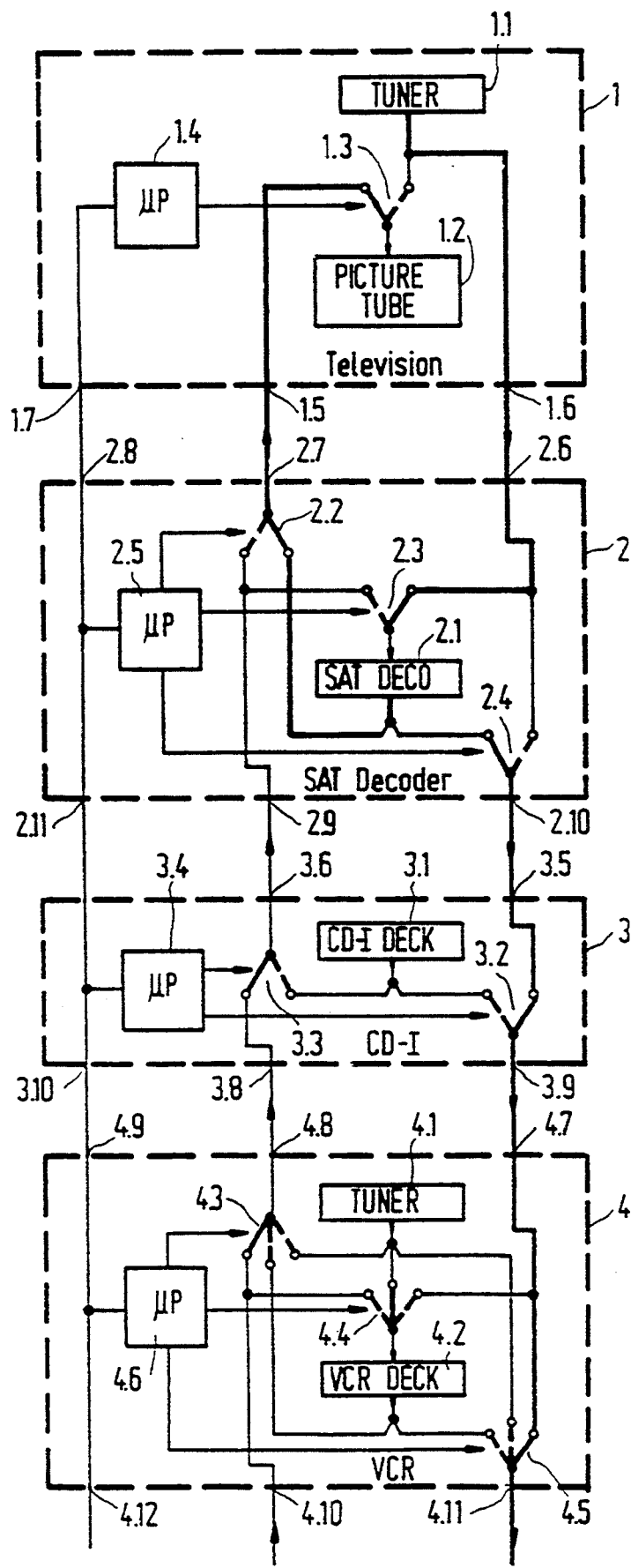

FIG. 3 shows, when going out from the situation as shown in FIG. 1, the situation where the satellite decoder apparatus 2 is switched on. When the decoder apparatus 2 is switched on, the user must select whether the signal from the terminal 2.6 or from the terminal 2.9 should be decoded. In the case where watching is the prime intent, i.e. the television's tuner 1.1 is used, the signal input 2.6 is selected by means of the selector switch 2.3. Switching the satellite decoder apparatus on, is detected by the microprocessor 2.5, which supplies control signals to the selector switches 2.2 and 2.4 so as to position them in the position as shown. The decoded signal is thus available at the signal outputs 2.7 and 2.10 of the decoder apparatus 2. The microprocessor 2.5 further generates a control signal at the control signal terminals 2.8 and 2.11, which control signal is thus supplied to all other apparatuses connected in the chain. Upon receipt of the control signal by the microprocessor 1.4 in the television apparatus 1, this microprocessor generates a switching signal which is supplied to the selector switch 1.3, under the influence of which the switch 1.3 is positioned in the position as shown. The decoded signal supplied by the decoder apparatus 2 can thus be displayed on the tube 1.2 of the television apparatus 1 and recorded by the video recorder 4, if needed.

From the above description it has become clear that the interconnection system comprises video apparatuses all, except for the television apparatus, having first and second connector means. Present day video apparatuses that are on the market usually have only one connector means in the form of a SCART connector. One such present day video apparatus could be connected via its single SCART connector to the non-used second connector means of the video recorder 4. More such video apparatuses however, can not be connected together so as to form an interconnection system as shown in the figures.

FIGS. 4, 5, 6 and 7 show embodiments of adapter apparatuses according to the invention, which enable present day video apparatuses to be connected to the interconnection system as described above.

Figure 4:
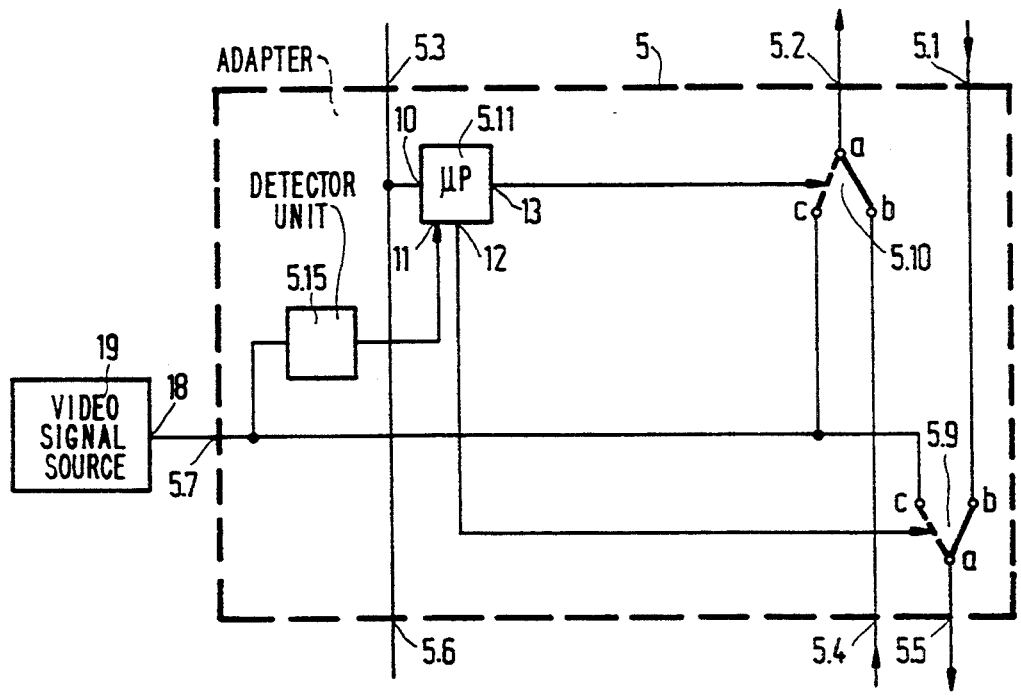
FIG. 4 shows a first embodiment of the apparatus according to the invention.

FIG. 4 shows an adapter apparatus for coupling a video source 19 provided with a single output 18, which can be a CVBS output or an Y/C output, to the interconnection system.

Figure 5:
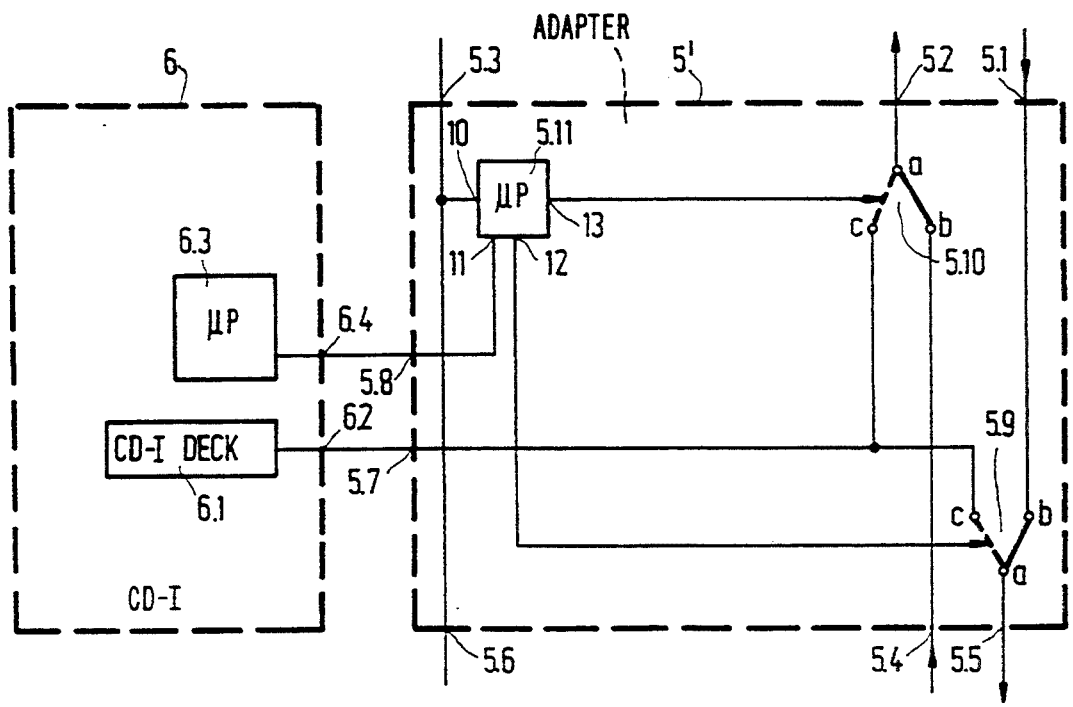
FIG. 5 shows a second embodiment of the apparatus according to the invention.
Figure 6:
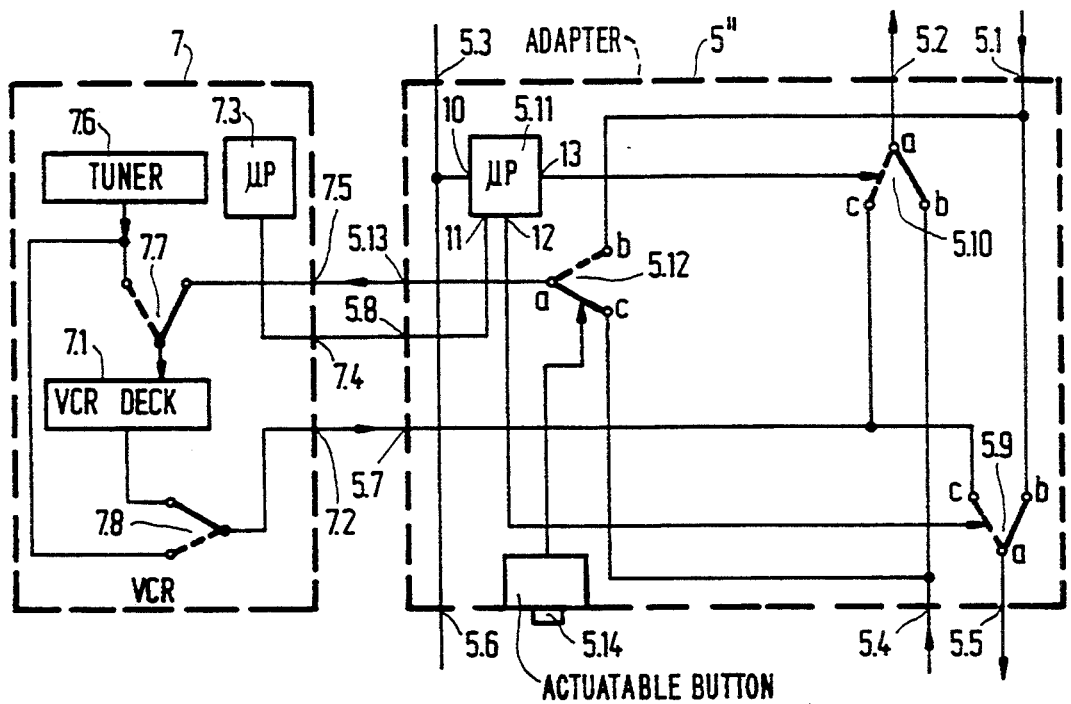
FIG. 6 shows a third embodiment of the apparatus according to the invention.

FIG. 5 shows an adapter apparatus for coupling a present day video source, such as a CD-I player with a single SCART connector, to the interconnection system, and FIG. 6 shows an adapter apparatus for coupling a present day video reproducer/receiver apparatus, such as a video recorder provided with a single SCART connector, to the interconnection system.

The adapter apparatus of FIG. 4 comprises first connector means having a signal input terminal 5.1, a signal output terminal 5.2 and a control signal terminal 5.3, second connector means having a signal input terminal 5.4, a signal output terminal 5.5 and a control signal terminal 5.6, and third connector means having a signal input terminal 5.7, first switching means 5.9, second switching means 5.10 and a microprocessor circuit 5.11. The first and the second connector means are again preferably in the form of a SCART connector. The terminals 5.3 and 5.6 are again the pins with number 10 in the first and second SCART connectors. The terminal a of the switching means 5.9 is coupled to the signal output terminal 5.5. Terminal b of the switch 5.9 is coupled to the signal input terminal 5.1. Terminal a of the switch 5.10 is coupled to the signal output terminal 5.2, and terminal b of the switch 5.10 is coupled to the signal input terminal 5.4. Terminals c of the switches 5.9 and 5.10 are both coupled to the signal input terminal 5.7. The microprocessor 5.11 has a first terminal 10 coupled to the interconnected control signal terminals 5.3 and 5.6, a second terminal 11 coupled to an output of a detector unit 5.15 and switch control signal outputs 12 and 13. The signal input terminal 5.7 is further coupled to an input of the detector unit 5.15. The microprocessor 5.11 is adapted to generate control signals at its outputs 12 and 13 so as to control the position of the switches 5.9 and 5.10. The microprocessor 5.11 generates the switch control signals at the outputs 12 and 13 in response to the control signals applied to the microprocessor via its terminals 10 and 11.

FIG. 4 shows a video signal source 19, having a signal output terminal 18, e.g. in the form of a CVBS output or an Y/C output, coupled to the signal input terminal 5.7 of the adapter apparatus 5.

The functioning of the adapter apparatus 5 is as follows. The adapter apparatus 5 can be coupled in the chain of FIG. 1, e.g. instead of the CD-I player 3 in the chain. This means that the terminals 5.1, 5,2 and 5.3 of the first connector of the adapter apparatus 5 are coupled to the terminals 2.10, 2.9 and 2.11 respectively, of the satellite decoder 2 in FIG. 2, and that the terminals 5.4, 5.5 and 5.6 of the second connector of the adapter apparatus are coupled to the terminals 4.8, 4.7 and 4.9, respectively, of the video recorder 4 in FIG. 1. If the apparatus that is coupled to the third connector means of the adapter apparatus 5 is not switched on, or is in a standby mode, then the microprocessor 5.11 generates such control signals at its outputs 12 and 13 that the switches 5.9 and 5.10 are in the positions as shown in FIG. 4. Signals that are applied to the terminal 5.1 via the down-path are looped through to the terminal 5.5 and the signals that are applied to the terminal 5.4 in the up-path are looped through to the terminal 5.2.

Switching the signal source 19 'on' realizes a video signal to occur at the output 18, which signal is applied to the terminal 5.7. The detector 5.15 detects the transition from a 'no-signal' situation to a 'signal-present' situation and generates a control signal, which is applied to the terminal 11 of the microprocessor 5.11. Upon receipt of this control signal, the microprocessor 5.11 generates a control signal at at least one of its two outputs 12 and 13, so that at least one of the switches 5.9 and 5.10 is switched to the other position. This one switch could be the switch 5.10, so that the signal input terminal 5.7 is coupled to the signal output terminal 5.2, via the switch 5.10. Further, the microprocessor 5.11 generates a control signal at the terminal 10 in response to the control signal applied to its input 11. This control signal generated by the microprocessor 5.11 is fed via the terminal 5.3 and the line with number 10 in the SCART cables between the adapter apparatus 5 and the satellite decoder apparatus 2 and between the satellite decoder apparatus 2 and the television apparatus 1 to the microprocessors 1.4 and 2.5 in the said apparatuses. Under the influence of this control signal, the microprocessor 2.5 generates a control signal for the switch 2.2 so that it is switched to the position in which the terminals 2.9 and 2.7 are connected with each other. Further, the microprocessor 1.4 generates a control signal so that the selector switch 1.3 is switched to the position in which the input of the picture tube 1.2 is connected to the signal input terminal 1.5. The video signal supplied by the signal source 19 will thus be visible on the picture tube 1.2 of the television apparatus 1.

The microprocessor 5.11 can be adapted to switch both switches 5.9 and 5.10 to the other position, in response to the control signal applied to its control input 11. In that situation, the video signal from the signal source 19 is also available for recording on the video recorder 4. The adapter apparatus 5 can further be provided with a selection button (not shown), which can manually be activated so as to select either the output 5.2 or the output 5.5 to be the signal output terminal for the video signal applied to the input terminal 5.7 by the source 19. The manually activated button is coupled to the microprocessor 5.11 as well. Now the microprocessor 5.11 generates in response to the control signal applied to the input 11 a control signal at the output 12 or the output 13 dependent of the actuation of the selection button, so that a connection is made in the adapter 5 between the terminal 5.7 and either terminal 5.2 or terminal 5.5.

In the case that the video recorder 4 records a video signal generated by the satellite decoder apparatus 2, it is said previously that the switches 2.4, which should be in its left position, and 3.2, which should be in its fight position, are protected against a switching action to the other position. This means that, in the case that the CD-I deck 3 is replaced by the adapter apparatus 5, the switch 5.9 should be in the position as shown in FIG. 4 and that this switch should be in the same way protected from being switched over to the other position.

FIG. 5 shows an adapter apparatus 5' which is slightly different from the adapter apparatus 5 of FIG. 4. The third connector means is now further provided with a control signal terminal 5.8 which is coupled to the second terminal 11 of the microprocessor circuit 5.11. The third connector means are preferably in the form of a SCART connector. Further the detector unit 5.15 of FIG. 4 has been left out.

FIG. 5 shows a present day CD-I player 6 provided with a single SCART connector being coupled to the adapter apparatus 5'. The player 6 comprises a CD-I reproduction deck 6.1 having an output coupled to a signal output terminal 6.2 of the SCART connector, and a microprocessor 6.3 having a control signal output coupled to a control signal terminal 6.4 of the SCART connector. The terminal 6.4 is the pin with number 8 in the SCART connector, which is coupled to the control signal terminal 5.8 of the adapter apparatus 5'.

The functioning of the adapter apparatus 5' is as follows. The adapter apparatus 5' can again be coupled in the chain of FIG. 1, e.g. instead of the CD-I player 3 in the chain. If the CD-I player 6 that is coupled to the third connector means of the adapter apparatus 5' is not switched on, or is in a standby mode, then the microprocessor 5.11 generates such control signals at its outputs 12 and 13 that the switches 5.9 and 5.10 are again in the positions as shown in FIG. 5.

Switching the CD-I player 6 to reproduction, is detected by the microprocessor 6.3, and a control signal (logic 'one', or 'high') is generated at the terminal 6.4 (pin 8 of the SCART terminal), indicating that the player 6 now acts as a video signal source. Upon receipt of this control signal, the microprocessor 5.11 generates a control signal at at least one of its two outputs 12 and 13, so that at least one of the switches 5.9 and 5.10 is switched to the other position. The functioning of the microprocessor 5.11 in response to the control signal applied to its terminal 11 is further identical to the functioning as described above with reference to FIG. 4. So, from a further discussion will be refrained.

FIG. 6 shows another embodiment of the adapter apparatus according to the invention. The adapter 5" shows a large resemblance with the adapter 5' of FIG. 5. The adapter 5" further comprises third switching means 5.12, and a signal output terminal in the third connector means. The signal output terminal 5.13 is coupled to the terminal a of the switching means 5.12. The terminals b and c of the switching means 5.12 are coupled to the signal input terminal 5.1 and 5.4, respectively. The adapter apparatus 5" also comprises manually actuatable button means 5.14. The button means 5.14 enable the user to control the position of the switching means 5.12, so as to select either the signal applied to the terminal 5.1 or the signal applied to the terminal 5.4 for interconnection with the terminal 5.13. The button means 5.14 are mechanically or electrically coupled to the third switching means 5.12, so as to control the position of the switching means 5.12. FIG. 6 shows an electrical coupling between the button means 5.14 and the switching means 5.12.

A present day video recorder 7 provided with a single SCART connector is coupled to the third connector means of the adapter apparatus 5". Switching the video recorder in its reproduction mode results in the same behavior as has been described above with reference to FIG. 5. The deck 7.1 is set to its reproduction mode, and the switch 7.8 is in the position as shown and connects the output of the deck 7.1 to the signal output terminal 7.2. The microprocessor 7.3 generates the control signal on the control signal terminal 7.4, which is the pin 8 of the SCART connector, indicating that the video recorder 7 is in its reproduction mode. The control of the position of the switches 5.9 and 5.10 is the same as described above. Therefore, no further description thereof will be given.

Switching the video recorder 7 to recording means that the switch 7.7 is switched to the position as shown. By manually actuating the button 5.14, the switch 5.12 can be switched to the one or the other position, so that the user can select either the video signal present on the input terminal 5.1 or the video signal present on the input terminal 5.4 to be recorded on the deck 7.1.

Figure 7:
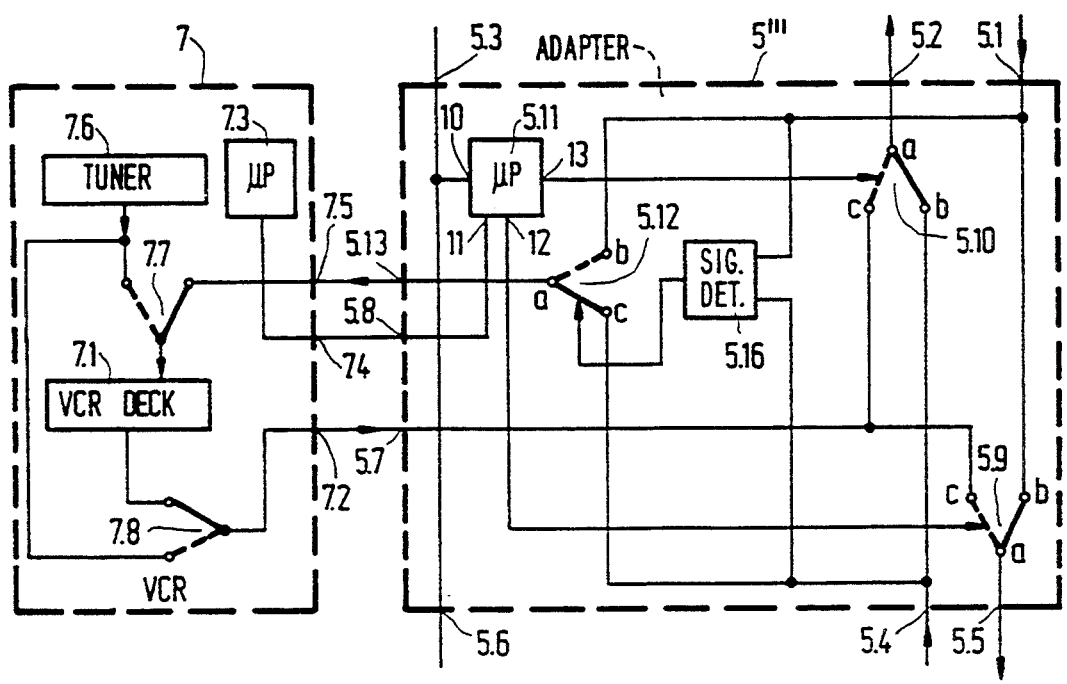
FIG. 7 shows a fourth embodiment of the apparatus according to the invention.

FIG. 7 shows an embodiment of the adapter apparatus which is slightly different from the adapter apparatus of FIG. 6, in that the selection of the incoming signals for the video recorder 7 by means of the switch 5.12 is now realized automatically. To that purpose, the apparatus 5'" comprises a signal detector 5.16 having first and second inputs coupled to the signal input terminals 5.1 and 5.4 of the adapter apparatus and an output coupled to a control signal input of the switch 5.12. The control of the switch position of the switch 5.12 under the influence of the control signal generated by the detector 5.16 is as follows.

If no signal is present on either input terminals 5.1 and 5.4, the switch is in a certain position, e.g. a position as shown in FIG. 7 in which the terminals a and c are interconnected. Upon the detection by the detector 5.16 of a transition of a 'no-signal' situation to a 'signal-present' situation at the terminal 5.1, a control signal of the first kind is generated, under the influence of which the switch is positioned in the position a-b, so that the signal present at the terminal 5.1 is applied to the terminal 5.13. Suppose that the detector 5.16 now detects a transition of a 'no-signal' situation to a 'signal-present' situation at the terminal 5.4. As long a signal at the terminal 5.1 is present, no switching over of the switch 5.12 to the position a-c will take place. Only after a disappearance of the signal present at the terminal 5.1, the switch will be switched over to the position a-c under the influence of a control signal of the second kind generated by the detector 5.16.

Figure 8:
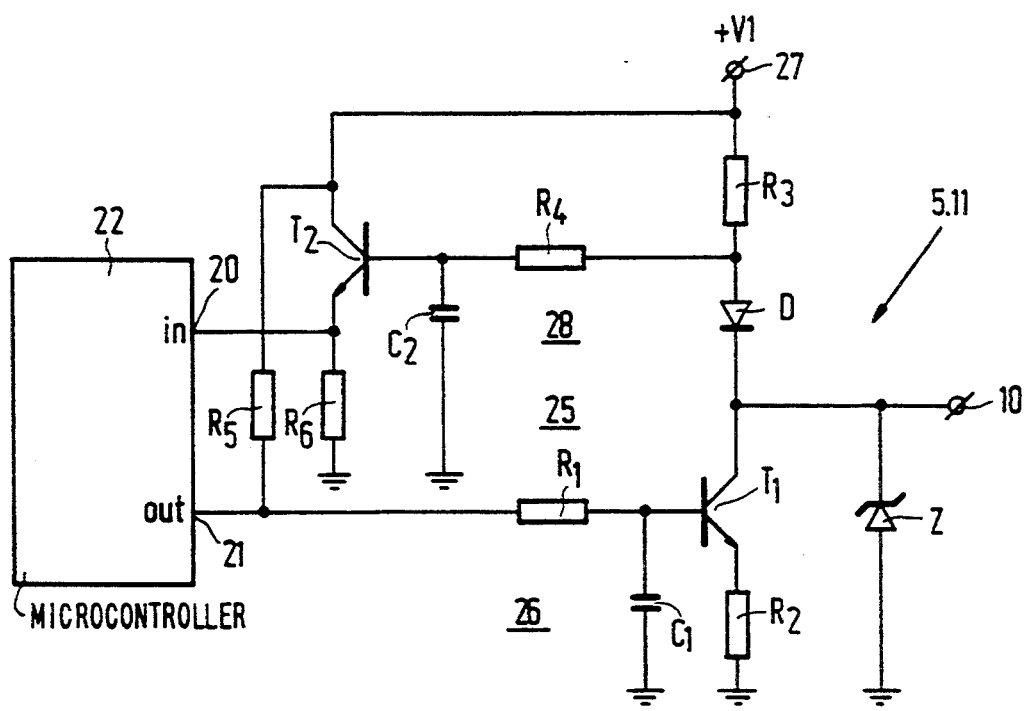
FIG. 8 shows an embodiment of the microprocessor circuit in the adapter apparatus.

FIG. 8 shows an embodiment of the microprocessor circuit 5.11. The microprocessor units 1.4, 2.5, 3.4 and 4.6 in the other apparatuses in FIG. 1 are of the same construction. The terminal 10, which should be coupled to pin 10 of the SCART cable, is coupled to an input 20 and an output 21 of a microcontroller chip 22 via an input-output circuit 25. The microcontroller chip 22 can be a microcontroller of the 8051 IC family, described in Philips components data handbook 1989, IC14 on microcontrollers NMOS, CMOS, such as the PCB80C51BH-3, see page 177 and on in the data handbook.

The output 21 of the microcontroller 22 is coupled to the pin 10 via a low-pass filter 26, comprising the resistor $R_1$ and the capacitor $C_1$, and an amplifier, comprising the transistor $T_1$. The emitter of the transistor $T_1$ is coupled to a point of constant potential, which is around, via a resistor $R_2$ of low resistive value. The collector of the transistor $T_1$ is coupled to terminal 10, via a zener diode Z to the said point of constant potential (ground), and via a series connection of a diode D and a resistor $R_3$ to an other point 27 of constant potential, which is a positive voltage $v_1$ of e.g. 5 Volts.

The terminal 10 is coupled to the input 20 of the microcontroller 22 via the diode D, a low-pass filter 28 comprising a resistor $R_4$ and a capacitor $C_2$, and an amplifier, comprising the transistor $T_2$. The collector of the transistor $T_2$ is coupled to the point 27 of constant potential, which point is further coupled to the input 21 of the microcontroller 22 via a resistor $R_5$. The emitter of the transistor $T_2$ is coupled to the input 20 of the microcontroller 22 and via a resistor $R_6$ to ground.

The line 10 in the SCART cable interconnecting the apparatuses is a single communication bus between the apparatuses which operates in a 'wired-and' configuration, where each apparatus contains a pull-up resistor, which is the resistor $R_3$ in FIG. 6 connected to the positive voltage at point 27. Communication on the bus is initiated by an apparatus pulling the bus low. Pulling the bus low is realized by the microcontroller 22 by switching the voltage at the output 21 to 'high', which equals a voltage of 5 Volts. The presence of the low-pass filter 26 means that a gradual change from the 'high' state to the 'low' state at the terminal 10 takes place. The inclusion of the low-pass filter 26 is neccessary in order to prevent high frequency crosstalk signals from occurring on the lines in the SCART cables carrying the video and audio signals. In the absence of the low-pass filter 26, the signal transitions from the 'high' to the 'low' state, or vice versa, at the output 21 would result in high currents at the terminal 10, causing the crosstalk signals to occur. The low-pass filter 26 filters out the high frequency components in the signal transitions, so that they do not appear at the terminal 10.

The input 20 senses the signal present at the terminal 10, in order to receive a message from another apparatus. The low-pass filter 28 prevents impulsive noise present on the terminal 10 from receiving the input 20, so that they can not be detected erroneously by the microcontroller as messages from other apparatuses. The low-pass filter 28 could eventually be realized in software in the controller 22.

The zener diode might be included so as to obtain a further protection against the occurrence of impulsive disturbances on the ground connection in the SCART cable, which disturbances can be the result of static discharges that occurred in e.g. the television apparatus.

The diode D is needed in order to isolate the terminal 10 from ground, if the apparatus incorporating the microprocessor circuit of FIG. 6 is switched off.

The diode D and the transistor $T_2$ should be chosen such that their threshold values are substantially equal, so that the voltages at terminal 10 and the input 20 are substantially equal.

Communication over the line 10 could hake place in the way as described in European patent application 437,882 A1 (PHN 13215), see especially the description relating to FIG. 3 in the said application. Another way of communicating over the line 10 will be described hereafter.

Figure 9:
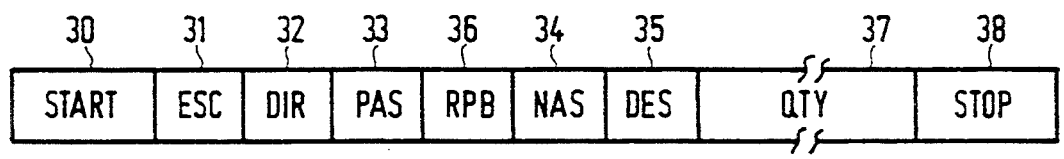
FIG. 9 shows the message frame generated on the line 10 of the SCART cable.

Communication on line 10 is initiated by an apparatus pulling the bus 'low' and subsequently generating a message frame, pulse coded as shown in FIG. 9. The message frame of FIG. 9 comprises a start bit 30, an escape bit ESC 31, a direction bit DIR 32, a PAS bit 33, a NAS bit 34, a destination bit DES 35, a record protect bit RPB 36, a number of quality bits QTY 37 and a stop bit 38. The pulse formats of all the bits, except for the start, and eventually the stop bit, are identical. The start bit has a format as shown in FIG. 10a. The other bits can be a 'zero' ('0') bit, or a 'one' ('1') bit. The formats of the '0' and '1' bits are shown in FIG. 10b and 10c, respectively.

An apparatus that intends to initiate a communication via line 10 is called an initiator. In order to become an initiator, an apparatus must first test that line 10 is free for use. That is, the line must be 'high' for a certain minimum period of time. Then the initiator starts a message by generating the start bit. That is, it generates a high-to-low transition on the bus, at time t=0 in FIG. 10a, followed by a low-to-high transition after a specific period of time $T_1$. The pulse format of the start bit is unique for the purpose of identifying the start of a message frame. The start bit must be validated by its 'low' duration $T_1$ and its pulse duration $T_p$. The start bit is followed by a series of data bits whose starting point is defined by subsequent high-to-low transitions. The data bits include a low-to-high transition which occur a time interval $T_2$ or $T_3$ after the high-to-low transition, dependent whether the data bit is a '0' bit or a '1' bit respectively, see FIG. 10b and 10c.

Apparatuses that respond to these high-to-low transitions from an initiator are called followers. There can be more than one follower at a time. The sampling instant for detecting whether a data bit is '0' or '1' is at $t=t_1$ in the FIG. 10b and c. Followers can share in generating data bits as shown in FIG. 11. FIG. 11a shows the initiator's output signal, generating three data bits $DB_1$, $DB_2$ and $DB_3$ of the values '1', '0' and '0', respectively. FIG. 11b shows the follower's output signal. From FIG. 11b it can be seen that a follower leaves the line 10 'high' for a logical '1' and a logical '0' is generated by pulling the bus low immediately after the high-to-low transition from the initiator. FIG. 11c shows the resulting signal on line 10. The arrows show the time instants for detecting the data bits by an apparatus connected to line 10.

Failure to validate the star bit must result in a follower ignoring the rest of the message frame.

The ESC bit 31 is generated only by the initiator and must be a logical zero to indicate that the following data is of the contents and the format as described above. The DIR bit 32 is generated by the initiator to indicate the signal path, the 'up' path, or the 'down' path, that is under control in the current message frame. This bit must be used by all active followers to determine that each apparatus is active in the same direction before participating in the communication.

The PAS (present active source) bit 33 is a bit whose value is pulled down (logical zero) by an active signal source when a source is currently active in the direction as indicated by the preceding DIR bit. Only one source can be active in one direction (either the 'up' or the 'down' direction). Active followers of the same direction must test and use this bit in the decision as to whether or not to use the subsequent signal quality dam.

The NAS (new active source) bit 34 is a bit whose value is pulled down (logical zero) by an initiator that is attempting to source its video signals onto the SCART interconnection. When this bit is 'zero', the current active source must respond by removing its video signals.

The RPB (record protect) bit 36 is an arbitration type bit, as explained with reference to FIG. 11. Its level is normally '1' if the signal path indicated by the DIR bit is free to use. However, the signal path can be in use by at least two apparatuses cooperating together over the said signal path in order to record a signal, that is a video recorder and e.g. a video signal source such as a CD-I player. In that situation the signal path will be record protected, which means that the signal path is protected against an interference by a new active source. The RPB bit will be pulled down now to '0' by one of the at least two active apparatuses that communicate with each other over the signal path in question.

The DES (destination) bit 35 is also an arbitration type bit. Its level is pulled down (logical zero) by all devices acting as active video signal destinations of the same direction. This bit must be zero in order to act on subsequent signal quality dam.

The signal quality bits QTY 37 are arbitration type bits. Source and destination apparatuses will generate a 'low' bit if a video signal with a certain signal quality, such as Y/C or RGB can not be generated or processed.

The stop bit 38 can have the same structure as the start bit. It is also possible that the stop bit equals a '1' bit, as per FIG. 10c.

The response of the micro processor circuit 5.11 on a control signal applied to the input 11 will be explained hereafter. In response to the control signal, a message frame as discussed above is generated at the terminal 10. The message frame should indicate that a new source wants to become active. Further the message frame indicates in which direction (in upwards direction: the DIR bit equals '1', or downwards direction: the DIR bit equals '0') the new source wants to supply its signal. The microprocessor 5.11 tests whether the RPB bit (record protect bit) 36 for the specified direction is pulled low by an apparatus which is active in the chain. Such an already active apparatus can be a video recorder which records a signal supplied by an other active source which supplies a signal in that same direction to the video recorder. If a 'low' RPB bit is detected for the specified direction (let us assume that this is the upwards direction), the microprocessor 5.11 does not generate a switching signal to the switch 5.10, so that the switch 5.10 remains in its position a-b.

In response to the RPB bit being '0', or because the microprocessor 5.11 is adapted to automatically generate two message frame, one in each direction, the microprocessor 5.11 can eventually generate a new message frame for the other direction (downwards), in order to determine the possibilities of supplying the signal in the downwards direction.

If no RPB bit being 'zero' has been detected for a specified direction, the microprocessor 5.11 generate a control signal to at least the switch 5.9 or 5.10 for the specified direction, so as to enable the signal supplied by the source 19, 6 or 7, to be transported in upwards and/or downwards direction to a destination apparatus. The NAS bit will become 'zero'.

Figure 12:
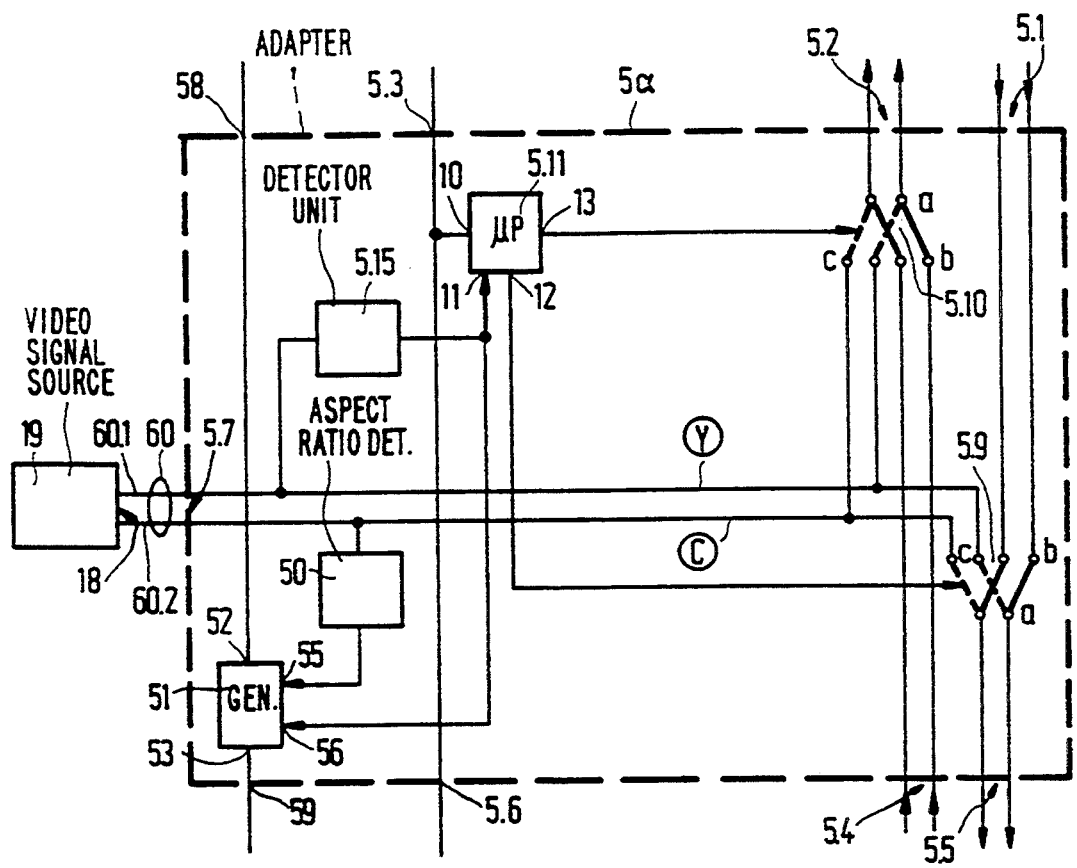
FIG. 12 shows a slightly amended version of the embodiment of FIG. 4.

FIG. 12 shows a further embodiment of the adapter apparatus in accordance with the invention. The apparatus of FIG. 12 shows a large resemblance with the apparatus of FIG. 4. The apparatus of FIG. 4 was meant to couple a video apparatus having an Y/C output, such as a video source that can supply a video signal in accordance with the SVHS format, to the chain. This has been made more clear in FIG. 12 by showing all the signal paths by means of two signal lines, one for the luminance or Y-component, and one for the chrominance or C-component.

The well-known line 8 in the SCART cable is used in a combination of a video signal source, such as a video recorder, and a television apparatus to switch the picture tube of the television apparatus over from the internal tuner to an external source, in the present situation the video recorder. This is realized when switching the video recorder into its reproduction mode. The video recorder realizes a transition of the signal level on the line 8 of the SCART cable from a 'low' level, between 0 Volts and 2.0 Volts, to a 'high' level, between 4.5 Volts and 12.0 Volts. This is detected by the television apparatus, so as to switch the picture tube over to the external source.

A further application of the control signal on line 8 of the SCART cable is to use this signal to indicate whether the signal from the external source is a 4:3 video signal or a 16:9 video signal. 4:3 video signals are video signals of pictures having an aspect ratio of 4:3, and 16:9 video signals are video signals of pictures having a 16:9 aspect ratio. An external source supplies a control signal on the line 8 of the SCART cable which lies in the range between 4.5 Volts and 7.0 Volts to indicate that the video signal is a 16:9 video signal. If a 4:3 video signal is supplied by the external source, a control signal lying in the range between 9.5 Volts and 12.0 Volts is generated. This format for the signal on line 8 of the SCART cable is summarized in the last two columns in the table below.

The video source 19 is coupled to the signal input terminal 5.7 of the apparatus 5a of FIG. 12 by means of the two line cable 60. The Y- and C-components of the video signal are supplied via the lines 60.1 and 60.2, respectively, in the cable 60, to the apparatus 5a. No signal line is present in the connection between the apparatuses 19 and 5a to transmit a control signal, which could be applied to the line 8 of the SCART cables connected to the first and second connector means of the apparatus 5a.

The apparatus 19 is capable of generating an aspect ratio signal indicating the aspect ratio of the pictures in the video signal. In order to indicate that the video signal supplied by the source 19 is a video signal having pictures with an aspect ratio of 16:9, the source adds a DC voltage to the C-signal component. It adds a DC voltage of for instance 5 Volts to the C-component of the video signal.

The apparatus 5a of FIG. 12 is now capable of generating the control voltage on the line 8 in response to the Y- and c-signal components supplied by the source 19 over the cable 60, so as to satisfy the format described above, and summarized in the table below. The apparatus further comprises an aspect ratio detector 50, having an input coupled to the line carrying the C-component of the video signal. An output of the detector 50 is coupled to a first input 55 of a generator 51. The detector 5.15, which has its input coupled to one of the lines carrying the video signal, in the present case the line carrying the Y-component of the video signal, has its output further coupled to a second input 56 of the generator 51. The generator 51 has pins 52 and 53 coupled to terminals 58 and 59 respectively, of the apparatus 5a. The terminals 58 and 59 are coupled to the lines 8 of the SCART cables coupled to the first and second connector means.

The detector 5.15 generates a 'high' signal if it detects the presence of a Y-signal component at its input. A 'low' signal is generated if it detects the absence of a Y-signal component at its input. This 'high' or 'low' level signal is applied to the input 56 of the generator 51. The aspect ratio detector 50 generates a 'high' signal at its output if it detects the 5 Volt DC component added to the C-component of the video signal applied to its input. In all other cases it generates a 'low' signal at its output. This 'high' and 'low' level signal is applied to the input 55 of the generator 51.

The table below shows how the generator 51 responds to the control signals applied to the inputs 55 and 56.

TABLE

| | pin 55 | voltage on line 8 | mode |
|---|---|---|---|
| L | L | 0 V to 2.0 V | internal |
| H | H | 4.5 V to 7.0 V | external, 16:9 |
| H | L | 9.5 V to 12.0 V | external, 4:3 |

Figure 13:
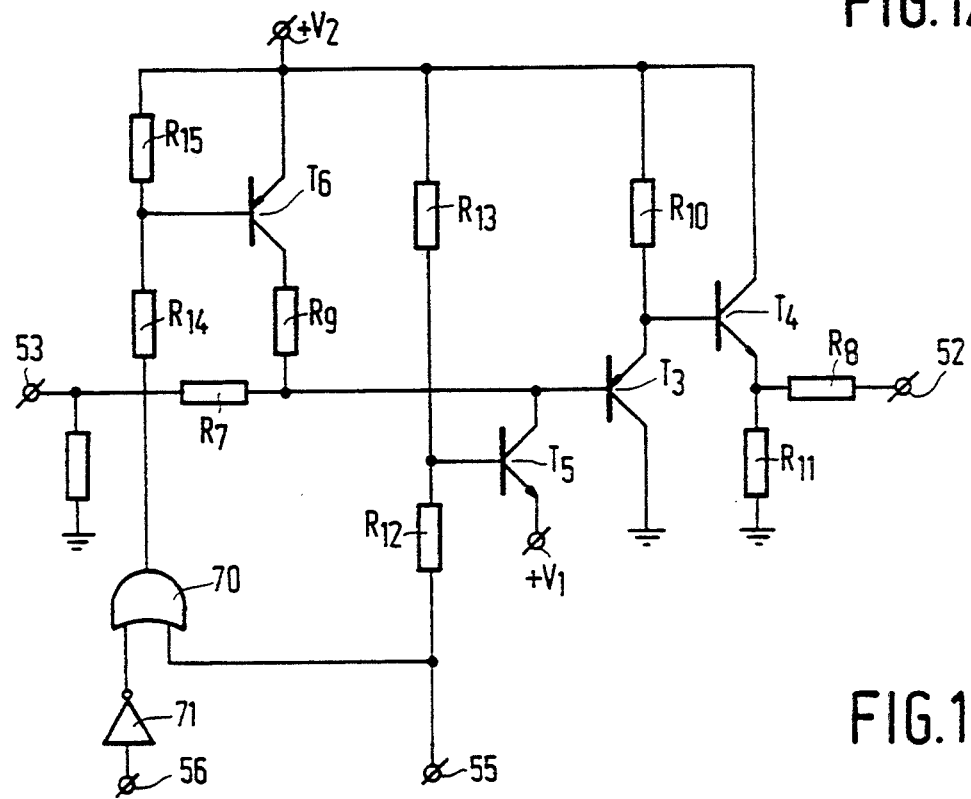
FIG. 13 shows an embodiment of the generator circuit from the apparatus of FIG. 12.

FIG. 13 shows a circuit construction of the generator 51. The terminal 53 is coupled to the terminal 52 via a series connection of a resistor $R_7$, transistors $T_3$ and $T_4$, and a resistor $R_8$. The collector of the transistor $T_3$ is coupled to the point of constant potential (ground). The base of the transistor $T_3$ is coupled to the other point of constant potential ($v_1$, which is 5 Volts) via a transistor $T_5$. The base of $T_3$ is further coupled to a third point of constant potential ($v_2$, which is 12 Volts) via a series connection of a resistor $R_9$ and a transistor $T_6$. The third point of constant potential is further coupled to the collector of $T_4$ and, via a resistor $R_{10}$ to the emitter of $T_3$. The emitter of transistor $T_4$ is coupled to ground via a resistor $R_{11}$. The terminal 55 is coupled to a first input of an OR-gate 70, to the base of the transisitor $T_5$ via a resistor $R_{12}$, and further via a resistor $R_{13}$ to the third point of constant potential ($v_2$). The terminal 56 is coupled to a second input of the OR-gate 70 via an invertor 71. The output of the OR-gate 70 is coupled to the base of the transistor $T_6$ via a resistor $R_{14}$, and further via a resistor $R_{15}$ to the point $v_2$.

In the situation where both pins 55 and 56 are 'low', this means that the base voltage of $T_5$ is 'low' and that the base voltage of $T_6$ is 'high'. This means that both transistors $T_5$ and $T_6$ are non-conductive. This means that, if a zero voltage is applied to terminal 53, $T_3$ is conductive and $T_4$ is non-conductive. Therefore, a zero voltage is present at the terminal 52. If a voltage of 5 Volts is applied to the terminal 53, both transistors $T_3$ and $T_4$ are conductive, and a voltage of 5 Volts appears at the terminal 52. If a voltage of 12 Volts is applied to the terminal 53, both transistors $T_3$ and $T_4$ are non-conductive, so that a voltage of 12 Volts appears at the terminal 52.

In the situation where pin 55 is 'high', the base voltages of both $T_5$ and $T_6$ are 'high'. Thus $T_5$ is conductive, making the base voltage of $T_3$ equal to 5 Volts. As both $T_3$ and $T_4$ are conductive now, the voltage at the terminal 52 is 5 Volts.

In the situation where pin 55 is 'low' and pin 56 is 'high', the base voltages of both transistors $T_5$ and $T_6$ are 'low', so that $T_5$ is non-conductive and $T_6$ is conductive. Therefore, a voltage of about 12 Volts appears at the base of $T_3$, and thus at the terminal 52, as both transistors $T_3$ and $T_4$ are non-conductive.

It should be noted that similar information as described above with reference to the information on line 8 can also be transmitted on line 10 of the SCART cable.

It should be noted that the adapter apparatus according to the invention has wider application possibilities than simply in a chain construction as shown in the FIGS. 1, 2 and 3. The adapter apparatus is equally well applicable in a combination of two video apparatuses that are coupled to each other via a SCART cable, where both apparatuses are provided with a single SCART connector only. With the adapter, it has become possible to connect one further apparatus provided with a single SCART connector to the combination. It is also possible to include the adapter apparatus in any audio or video signal source or receiver, in order to improve the interconnection possibilities. The adapter apparatus could e.g. be applied in a television apparatus, such as the television apparatus 1 in FIG. 1. The television apparatus will then be provided with a second SCART connector, which is coupled internally in the television apparatus with the third connector means of the adapter. In this application, the first, second and third connector means will not be detachable connector means, but fixed electrical connections will form the first, second and third connector means.

The apparatus in accordance with the invention has the advantage that other audio and/or video apparatuses can be connected to at least two interconnected audio and/or video apparatuses without the need to provide the apparatuses to be connected with additional connector means.

We claim:

1. An input-output circuit for use in a control signal generator means, said control signal generator means being provided with a controller, and said control signal generator means being provided in an apparatus comprising first and second connector means and first and second switching means, the first and second connector means each having a signal input terminal, a signal output terminal and a control signal terminal, the first and second switching means each having first, second and third terminals, the first terminal of the first switching means being coupled to the signal output terminal of the second connector means, the second terminal of the first switching means being coupled to the signal input terminal of the first connector means, the first terminal of the second switching means being coupled to the signal output terminal of the first connector means, the second terminal of the second switching means being coupled to the signal input terminal of the second connector means, the first and second switching means being adapted to couple the second or the third terminal to the first terminal under the influence of a first or a second control signal, respectively; the apparatus further comprising said control signal generator means having a first terminal coupled to the control signal terminals of the first and second connector means, and output terminals for supplying the first and second control signals for the first and second switching means; the input-output circuit comprising a first terminal that can be coupled to the first terminal of the control signal generator means, an input terminal that can be coupled to an output of the controller, and an output terminal that can be coupled to an input of the controller; characterized in that the input-output circuit further comprises first low-pass filter means coupled between the input terminal and the first terminal of the input-output circuit, and diode means coupled between the first terminal of the input-output circuit and a first point of constant potential.

2. The input-output circuit as claimed in claim 1, characterized in that the first low-pass filter means comprises a first amplifier coupled between the input terminal and the first terminal of the input-output circuit.

3. The input-output circuit as claimed in claim 2, characterized in that the input-output circuit further comprises a zener diode coupled between the first terminal of the input-output circuit and a second point of constant potential (ground).

4. The input-output circuit as claimed in claim 2, characterized in that the input-output circuit further comprises second low-pass filter means coupled in series with said diode means between the first terminal and the output terminal of said input-output circuit.

5. The input output circuit as claimed in claim 4, characterized in that the second low-pass filter means comprises an amplifier coupled in series with said diode means between the first terminal and the output terminal of said input-output circuit.

6. The input-output circuit as claimed in claim 2, characterized in that the input-output circuit further comprises a second amplifier coupled in series with said diode means between the first terminal and the output terminal of said input-output circuit.

7. The input-output circuit as claimed in claim 1, characterized in that the input-output circuit further comprises a zener diode coupled between the first terminal of the input-output circuit and a second point of constant potential (ground).

8. The input-output circuit as claimed in claim 1, characterized in that the input-output circuit further comprises second low-pass filter means coupled in series with said diode means between the first terminal and the output terminal of the input-output circuit.

9. The input output circuit as claimed in claim 8, characterized in that the second low-pass filter means comprises an amplifier coupled in series with said diode means between the first terminal and the output terminal of said input-output circuit.

10. The input-output circuit as claimed in claim 1, characterized in that the input-output circuit further comprises an amplifier coupled in series with said diode means between the first terminal and the output terminal of the input-output circuit.

* * * * *